United States Patent
Moshchuk et al.

(10) Patent No.: US 8,898,033 B2
(45) Date of Patent: Nov. 25, 2014

(54) VEHICLE STABILITY SYSTEMS AND METHODS

(75) Inventors: Nikolai K. Moshchuk, Grosse Pointe, MI (US); Ivan Fadeev, Saint-Petersburg (RU)

(73) Assignee: GM Global Technology Operations LLC, Detroit, MI (US)

(*) Notice: Subject to any disclaimer, the term of this patent is extended or adjusted under 35 U.S.C. 154(b) by 455 days.

(21) Appl. No.: 13/271,530

(22) Filed: Oct. 12, 2011

(65) Prior Publication Data
US 2013/0096867 A1    Apr. 18, 2013

(51) Int. Cl.
| | | |
|---|---|---|
| G01P 15/00 | (2006.01) | |
| G01P 15/08 | (2006.01) | |
| G06F 15/00 | (2006.01) | |
| G01P 3/44 | (2006.01) | |
| G01C 19/56 | (2012.01) | |

(52) U.S. Cl.
CPC ............... *G06F 15/00* (2013.01); *G01P 15/08* (2013.01); *G01P 3/44* (2013.01); *G01C 19/56* (2013.01)
USPC .......................................... 702/141; 180/400

(58) Field of Classification Search
USPC .......................................................... 702/141
See application file for complete search history.

(56) References Cited

U.S. PATENT DOCUMENTS

| | | | | |
|---|---|---|---|---|
| 4,254,465 A | * | 3/1981 | Land | 701/505 |
| 4,985,838 A | * | 1/1991 | Hashiguchi et al. | 701/90 |
| 5,819,206 A | * | 10/1998 | Horton et al. | 702/150 |
| 6,149,190 A | * | 11/2000 | Galvin et al. | 280/735 |
| 7,418,364 B1 | * | 8/2008 | Horton et al. | 702/153 |
| 7,966,146 B2 | * | 6/2011 | Shkolnikov | 702/141 |
| 2002/0040601 A1 | * | 4/2002 | Fyfe et al. | 73/490 |
| 2004/0134266 A1 | * | 7/2004 | Schroeder et al. | 73/117.3 |
| 2006/0125440 A1 | * | 6/2006 | Gordon et al. | 318/723 |
| 2006/0185429 A1 | * | 8/2006 | Liu et al. | 73/146.5 |
| 2007/0208483 A1 | * | 9/2007 | Rabin | 701/72 |
| 2008/0121071 A1 | * | 5/2008 | Plews | 74/84 S |
| 2009/0043441 A1 | * | 2/2009 | Breed | 701/29 |
| 2009/0048740 A1 | * | 2/2009 | Schiefele | 701/45 |
| 2009/0288485 A1 | * | 11/2009 | Ell et al. | 73/504.03 |
| 2010/0023220 A1 | * | 1/2010 | Nakashima et al. | 701/42 |
| 2010/0305837 A1 | * | 12/2010 | Gagliano | 701/111 |
| 2011/0153156 A1 | * | 6/2011 | Haller et al. | 701/36 |
| 2011/0206236 A1 | * | 8/2011 | Center, Jr. | 382/103 |
| 2011/0295549 A1 | * | 12/2011 | Takabayashi et al. | 702/142 |
| 2012/0071151 A1 | * | 3/2012 | Abramson et al. | 455/418 |
| 2012/0296601 A1 | * | 11/2012 | Eatwell | 702/141 |

* cited by examiner

*Primary Examiner* — Jonathan C Teixeira Moffat
*Assistant Examiner* — Alvaro Fortich
(74) *Attorney, Agent, or Firm* — Mickki D. Murray; Parks IP Law LLC

(57) ABSTRACT

Systems and methods for determining angular velocity of a vehicle. Systems include an array of accelerometers and a computing unit configured to determine angular velocity as a function of acceleration measured by the array of accelerometers. Angular velocity can then be used, for example, by stability systems to control the vehicle.

20 Claims, 2 Drawing Sheets

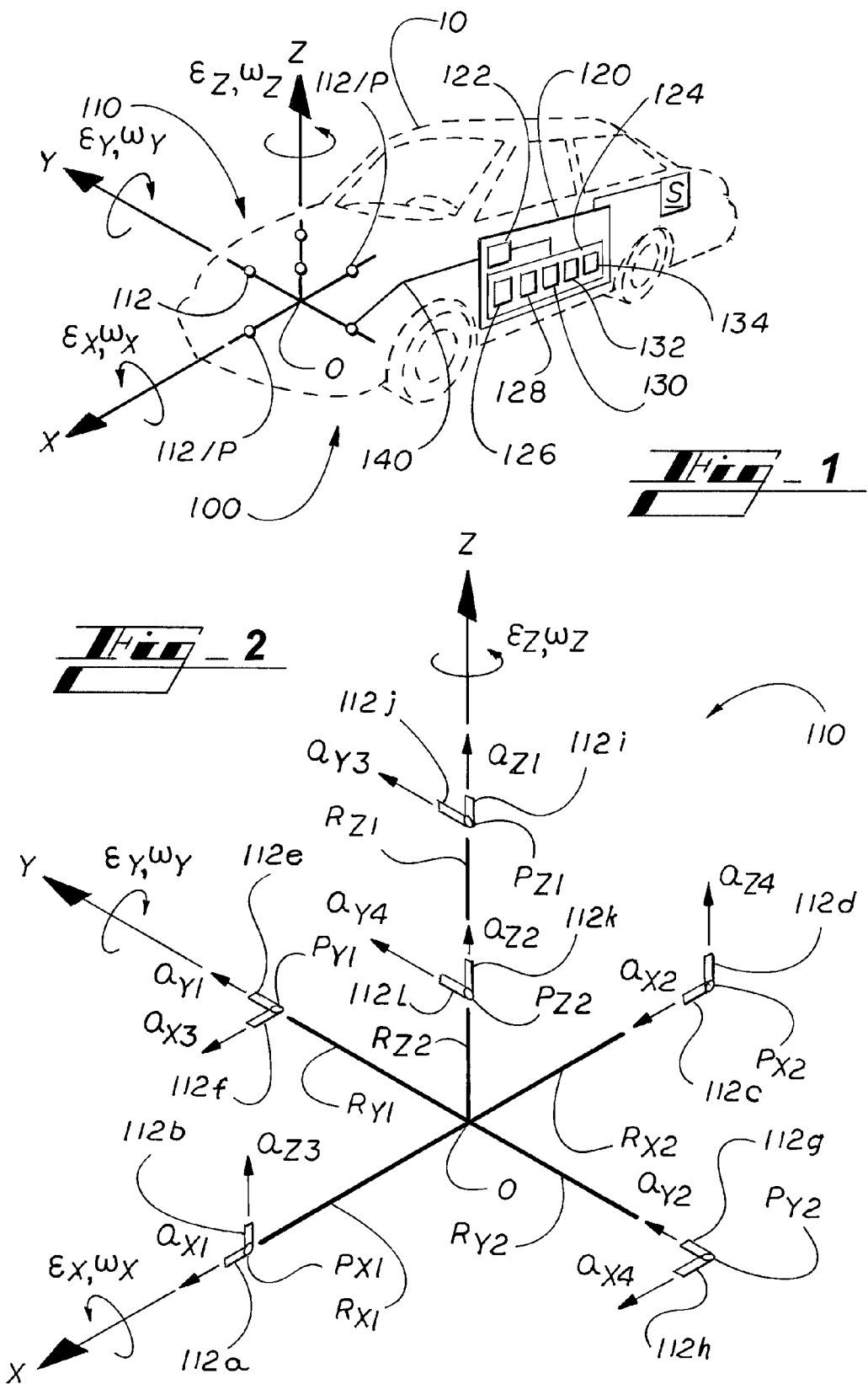

VEHICLE STABILITY SYSTEMS AND METHODS

TECHNICAL FIELD

The technical field of the present disclosure relates to vehicle stability systems and methods, generally, and more specifically to systems and methods for determining angular velocity.

BACKGROUND

Current vehicle stability systems can be expensive or inaccurate. Expensive yaw rate gyroscopes are commonly used. Another practice is to use lower cost accelerometers. However, because acceleration measured by accelerometers is typically integrated to get angular velocity, such angular velocity is prone to drift over time and require correction.

SUMMARY

The various embodiments provide systems and methods for accurately predicting angular velocity. According to an exemplary embodiment, a system for determining the angular velocity of a vehicle includes an array of accelerometers configured to measure tangential acceleration and normal acceleration and a computing unit configured to receive acceleration measurements from the array of accelerometers. The computing unit includes a processor and at least one software module including computer readable instructions that, when executed by the processor, determine the angular velocity of the vehicle. The computer readable instructions are configured to cause the processor to determine an angular acceleration as a function of tangential acceleration measurements and determine a centripetal acceleration as a function of normal acceleration measurements. The computer readable instructions are configured to also cause the processor to determine a first predicted angular velocity as a function of a previously predicted angular velocity and the angular acceleration, determine a correction factor as a function of the centripetal acceleration, a gain, and a previously predicted angular velocity, and determine a corrected predicted angular velocity as a function of the first predicted angular velocity and the correction factor.

The foregoing has broadly outlined some of the aspects and features of the various embodiments, which should be construed to be merely illustrative of various potential applications. Other beneficial results can be obtained by applying the disclosed information in a different manner or by combining various aspects of the disclosed embodiments. Other aspects and a more comprehensive understanding may be obtained by referring to the detailed description of the exemplary embodiments taken in conjunction with the accompanying drawings, in addition to the scope defined by the claims.

DESCRIPTION OF THE DRAWINGS

FIG. 1 is a schematic illustration of a vehicle including a system for determining angular velocity.

FIG. 2 is a schematic illustration of an array of accelerometers of the angular velocity system of FIG. 1 according to an exemplary embodiment.

DETAILED DESCRIPTION

As required, detailed embodiments are disclosed herein. It must be understood that the disclosed embodiments are merely exemplary and may be embodied in various and alternative forms, and combinations thereof. As used herein, the word exemplary is used expansively to refer to embodiments that serve as illustrations, specimens, models, or patterns. The figures are not necessarily to scale and some features may be exaggerated or minimized to so details of particular components. In other instances, well-known components, systems, materials, or methods being known to those of ordinary skill in the hart have not been described in detail in order to avoid obscuring the present disclosure. Therefore, specific structural and functional details disclosed herein are not to be interpreted as limiting, but merely as a basis for the claims and as a representative basis for teaching one skilled in the art.

The illustrated embodiments describe a vehicle system that accurately predicts angular velocity using accelerometers, such as relatively low cost accelerometers. The angular velocity system determines angular velocities representing the yaw rate, pitch rate, and/or roll rate of a vehicle. As such, the system is described with respect to a particular coordinate system. However, it should be understood that the system can be arranged as desired to measure angular velocity in various directions. Also, such a system can determine angular velocity in contexts other than automobiles, as shown in FIG. 1, such as aircraft, watercraft, and the like.

Referring to FIG. 1, a vehicle 10 includes a system 100 that is configured to determine a vector of angular velocity ω of the vehicle 10. The angular velocity system 100 is positioned in the vehicle 10 and oriented with respect to an exemplary coordinate system. The exemplary coordinate system is chosen with respect to the length, width, and height dimensions of the vehicle 10. The coordinate system includes an x-axis that extends longitudinally along the length of the vehicle 10, a y-axis that extends laterally along the width of the vehicle 10, and a z-axis that extends vertically along the height of the vehicle 10. The angular velocity system 100 is, in some embodiments, small enough to be positioned in different parts of the vehicle 10 (the system 100 is shown schematically in FIG. 1 and the size of the system 100 is exaggerated to show the elements of the system 100).

Figure 3:
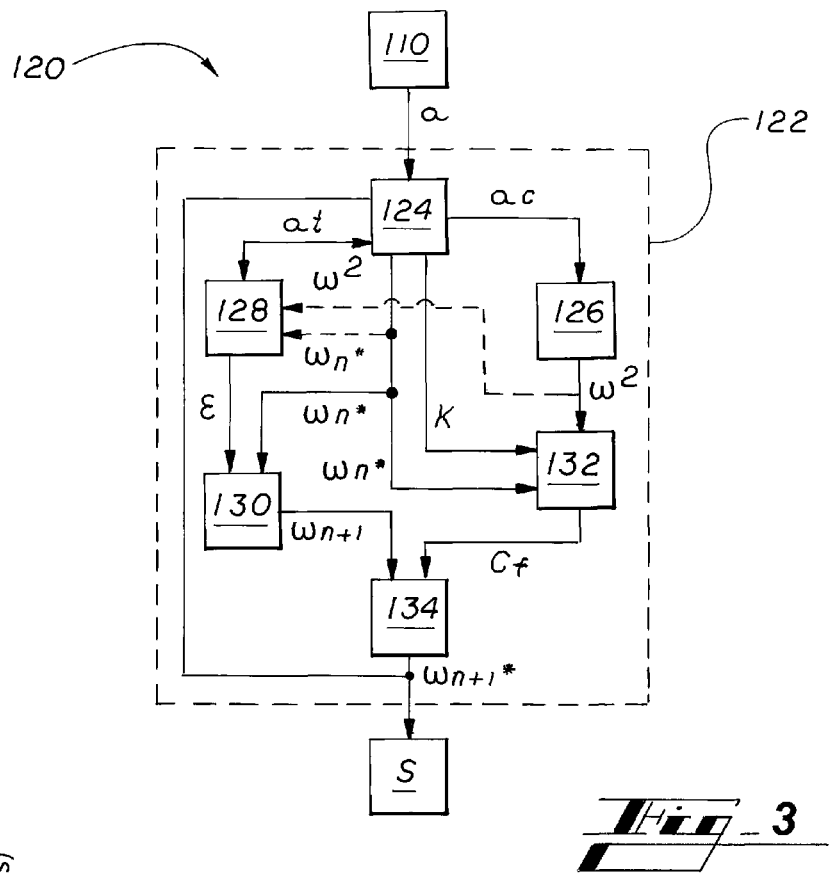
FIG. 3 is a flow diagram associated with the angular velocity system of FIG. 1.
Figure 4:
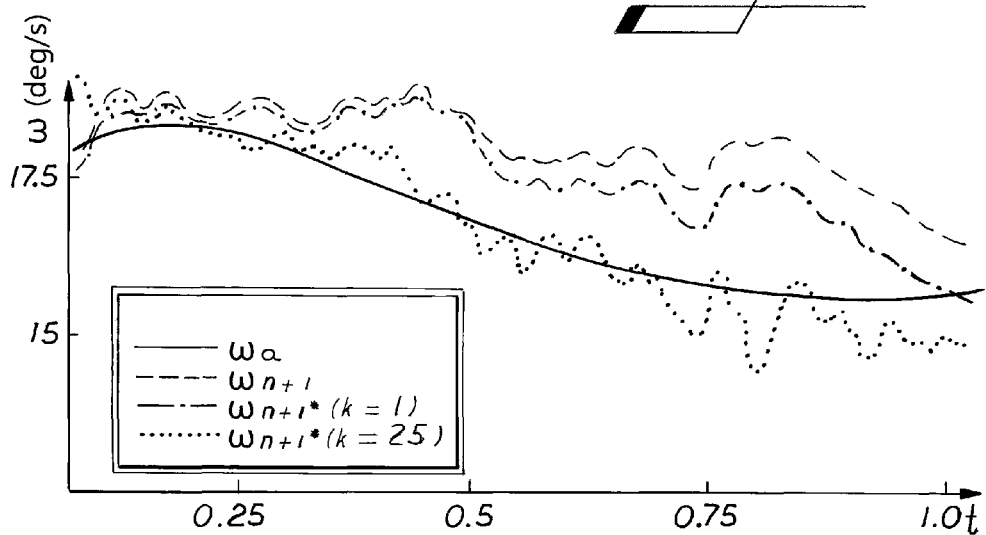
FIG. 4 is a graphical illustration of the performance of the system of FIG. 1.

Referring to FIGS. 1-3, the angular velocity system 100 includes an array 110 of accelerometers 112 and a computing unit (CPU) 120. The CPU 120 is connected to other vehicle systems S. For example, the CPU 120 provides a corrected predicted angular velocity $\omega_{n+1}^*$ to vehicle systems S such as stability control systems.

In general, the array 110 of accelerometers 112 is configured to make measurements of acceleration a at various points P in the vehicle 10 and in various directions x, y, z. In some embodiments, one or more of the accelerometers 112 measure acceleration along a single axis e.g., along one of the x, y, z axis. Exemplary accelerometers 112 that are configured to measure acceleration along a single axis x, y, z include thermal accelerometers, proof mass accelerometers, and the like.

Piezoresistive accelerometers include silicon piezoresistors in a suspension beam, a support frame, and a proof mass. As the support frame moves with respect to the proof mass, the length of the suspension beam changes and the resistivity of the embedded piezoresistors changes because of this elongation. One of the main advantages of the piezoresistive accelerometers is the simplicity of readout circuitry since it is only measuring the change in the resistance.

Thermal accelerometers use the principles of heat convection and are without a proof mass. Thermal accelerometers include a gas that is heated to a certain degree using a heat source in the middle of the sensor. Thermopiles are placed equidistantly on all four sides of the heat source so that the temperature gradient is symmetrical. When the sensor moves, the heated gas moves and the temperature gradient changes such that acceleration can be sensed. This sensor construction does not have moving parts, which provides a number of advantages over typical resonant sensors. Such advantages include insensitivity to shock and overload, no accumulation of mechanical fatigue, no high frequency content, simpler construction, better electromagnetic compatibility (EMC) immunity, and higher shock/impact survival rating.

Referring to FIG. 2, the array 110 includes pairs of accelerometers 112, each being associated with a point P in the coordinate system. The exemplary array 110 includes an arrangement of six pairs of accelerometers 112 that are positioned at points $P_{x1}$, $P_{x2}$, $P_{y1}$, $P_{y2}$, $P_{z1}$, $P_{z2}$. Generally, the accelerometers 112 are arranged to make two normal acceleration $a_c$ measurements for each axis and two tangential acceleration $a_t$ measurements for each axis. The elements $a_c$, $a_t$ are used for purposes of representing the various types of directional measurements and are not shown in FIG. 2.

In one embodiment, each of the points $P_{x1}$, $P_{x2}$, $P_{y1}$, $P_{y2}$, $P_{z1}$ is equally spaced apart from an origin O by a respective distance $R_{x1}$, $R_{x2}$, $R_{y1}$, $R_{y2}$, $R_{z1}$. The second z-axis point $P_{z2}$ is spaced apart from the origin O by a distance $R_{z2}$ that is less than the first z-axis point $P_{z1}$. This arrangement facilitates attaching the array 110 to a surface since both points $P_{z1}$, $P_{z2}$ are on the same (e.g., positive) side of the z-axis.

In alternative embodiments, all of the points are equidistant from the origin O, or the points are alternatively positioned so long as no three points are collinear. Further, accelerometers can be positioned throughout the vehicle to maximize the distance between the accelerometers and increase the accuracy of the calculations.

In alternative embodiments: a set of three accelerometers is associated with each of a number of points P and the set is configured to measure normal acceleration $a_c$ and two tangential accelerations $a_t$ in directions such that the normal acceleration and the two tangential accelerations are perpendicular to one another. Accelerometers can be arranged according to variations of these arrangements of accelerometers and, generally, in any arrangement in order to perform the methods described in further detail below.

Continuing with FIG. 2, the array 110 is configured to determine three orthogonal angular velocities (yaw rate $\omega_z$, pitch rate $\omega_y$, and roll rate $\omega_x$). Yaw rate $\omega_z$ is measured about the z-axis, roll rate $\omega_x$ is measured about the x-axis, and pitch rate $\omega_y$ is measured about the y-axis. The array 110 can be simplified as described in further detail below to determine a single angular velocity (e.g., yaw rate $\omega_z$).

A first pair of accelerometers 112a/112b, positioned at a first x-axis point $P_{x1}$ on the positive side of the x-axis, includes a first accelerometer 112a configured to measure acceleration $a_{x1}$ in the positive x-direction and a second accelerometer 112b configured to measure acceleration $a_{z3}$ in the positive z-direction.

A second pair of accelerometers 112c/112d, positioned at a second x-axis point $P_{x2}$ on the negative side of the x-axis, includes a third accelerometer 112c configured to measure acceleration $a_{x2}$ in the positive x-direction and a fourth accelerometer 112d configured to measure acceleration $a_{z4}$ in the positive z-direction.

A third pair of accelerometers 112e/112f, positioned at a first y-axis point $P_{y1}$ on the positive side of the y-axis, includes a fifth accelerometer 112e configured to measure acceleration $a_{y1}$ in the positive y-direction and a sixth accelerometer 112f configured to measure acceleration $a_{x3}$ in the positive x-direction.

A fourth pair of accelerometers 112g/112h, positioned at a second y-axis point $P_{y2}$ on the negative side of the y-axis, includes a seventh accelerometer 112g configured to measure acceleration $a_{y2}$ in the positive y-direction and an eighth accelerometer 112h configured to measure acceleration $a_{x4}$ in the positive x-direction.

A fifth pair of accelerometers 112i/112j, positioned at a first z-axis point $P_{z1}$ on the positive side of the z-axis, includes a ninth accelerometer 112i configured to measure acceleration $a_{z1}$ in the positive z-direction and a tenth accelerometer 112j configured to measure acceleration $a_{y3}$ in the positive y-direction.

A sixth pair of accelerometers 112k/112l, positioned at a second z-axis point $P_{z2}$ on the positive side of the z-axis, includes an eleventh accelerometer 112k that is configured to measure acceleration $a_{z2}$ in the positive z-direction and a twelfth accelerometer 112l that is configured to measure acceleration $a_{y4}$ in the positive y-direction.

The accelerometers 112a, 112c, 112e, 112g, 112i, 112k are configured to measure normal accelerations $a_{x1}$, $a_{x2}$, $a_{y1}$, $a_{y2}$, $a_{z1}$, $a_{z2}$ in directions that are collinear with the respective x, y, and z axes on which the accelerometers lie. The accelerometers 112b, 112d, 112f, 112h, 112j, 112l are configured to measure tangential accelerations $a_{x3}$, $a_{x4}$, $a_{y3}$, $a_{y4}$, $a_{z3}$, $a_{z4}$ in directions that are in planes perpendicular to the axes and parallel to respective x, y, and z axes on which the accelerometers lie.

In general, a relationship between the acceleration of two points fixed on a rigid body, such as vehicle 10, is given by EQ. 1:

$$a_p = a_o + \epsilon \times R_{p/o} + \omega \times (\omega \times R_{p/o})$$

where $a_p$ is the acceleration vector of a point P on the vehicle 10, $a_o$ is the acceleration vector of the origin O of the vehicle coordinate system 10 (See e.g., FIG. 2), $R_{p/o}$ is the position vector from the origin O to the point P, $\epsilon$ is the angular acceleration vector of the vehicle 10, and $\omega$ is the angular velocity vector of the vehicle 10. This equation can be simplified based on direction to get an equation associated with each accelerometer.

The normal accelerations $a_{x1}$, $a_{x2}$, $a_{y1}$, $a_{y2}$, $a_{z1}$, $a_{z2}$ are given by EQs. 2a:

$$a_{x1} = a_{xo} - (\omega_y^2 + \omega_z^2) R_{x1}$$

$$a_{x2} = a_{xo} + (\omega_y^2 + \omega_z^2) R_{x2}$$

$$a_{y1} = a_{yo} - (\omega_x^2 + \omega_z^2) R_{y1}$$

$$a_{y2} = a_{yo} + (\omega_z^2 + \omega_x^2) R_{y2}$$

$$a_{z1} = a_{zo} - (\omega_x^2 + \Omega_y^2) R_{z1}$$

$$a_{z2} = a_{zo} - (\omega_x^2 + \Omega_y^2) R_{z2}$$

The tangential accelerations $a_{x3}$, $a_{x4}$, $a_{y3}$, $a_{y4}$, $a_{z3}$, $a_{z4}$ are given by EQs. 2b:

$$a_{x3} = a_{xo} + \epsilon_z R_{y1} - \omega_x \omega_y R_{y1}$$

$$a_{x4} = a_{xo} - \epsilon_z R_{y2} + \omega_x \omega_y R_{y2}$$

$$a_{y3} = a_{yo} + \epsilon_x R_{z1} + \omega_y \omega_z R_{z1}$$

$$a_{y4} = a_{yo} + \epsilon_x R_{z2} + \omega_y \omega_z R_{z2}$$

$$a_{z3} = a_{zo} + \epsilon_y R_{x1} + \omega_x \omega_z R_{x1}$$

$$a_{z4} = a_{zo} - \epsilon_y R_{x2} - \omega_x \omega_z R_{x2}$$

Here, R is the position vector from the origin O to the respective point P, $a_o$ is the acceleration of the origin O in a respective direction, $\epsilon$ is the angular acceleration about a respective axis, and $\omega$ is the angular velocity about a respective axis.

The CPU 120 uses the acceleration a measurements to determine angular acceleration s and centripetal acceleration $\omega^2$, which are used to determine corrected predicted angular velocity $\omega_{n+1}*$ as described in further detail below. The CPU 120 determines centripetal acceleration $\omega^2$ as a function of normal acceleration $a_c$ measurements and determines angular acceleration $\epsilon$ as a function of tangential acceleration $a_t$ measurements.

Referring to FIGS. 1 and 3, the CPU 120 includes a processor 122, a memory 124 or other tangible, non-transitory, computer-readable media, and software modules 126, 128, 130, 132, 134 that include computer-executable instructions. The software modules 126, 128, 130, 132, 134 that are stored in the memory 124. Each software module may include at least one tangible, non-transitory hardware component.

While the methods described herein may, at times, be described in a general context of computer-executable instructions, the methods of the present disclosure can also be implemented in combination with other program modules and/or as a combination of hardware and software. The term software module, or variants thereof, is used expansively herein to include routines, program modules, programs, components, data structures, algorithms, and the like. Software modules can be implemented on various system configurations, including servers, network systems, single-processor or multiprocessor systems, minicomputers, mainframe computers, personal computers, hand-held computing devices, mobile devices, microprocessor-based, programmable consumer electronics, combinations thereof, and the like.

Computer readable media includes, for example, volatile media, non-volatile media, removable media, and non-removable media. The term computer-readable media and variants thereof, as used in the specification and claims, refer to tangible, non-transitory, storage media. In some embodiments, storage media includes volatile and/or non-volatile, removable, and/or non-removable media, such as, for example, random access memory (RAM), read-only memory (ROM), electrically erasable programmable read-only memory (EEPROM), solid state memory or other memory technology, CD ROM, DVD, BLU-RAY, or other optical disk storage, magnetic tape, magnetic disk storage or other magnetic storage devices.

Referring to FIG. 1, the CPU 120 includes an interface 140 that is configured to receive acceleration a measurements from the accelerometers 112. The processor 122 is configured to store the acceleration a measurements in the memory 124 and access the acceleration a measurements and to determine a value for corrected predicted angular velocity $\omega_{n+1}*$ according to the instructions of the software modules 126, 128, 130, 132, 134. Certain software module instructions associated with the array 110 of accelerometers 112 are described in further detail below.

In general, referring to FIG. 3, the first software module 126 includes instructions for determining centripetal acceleration $\omega^2$ as a function of normal acceleration $a_c$ measurements; the second software module 128 includes instructions for determining angular acceleration $\epsilon$ as a function of tangential acceleration $a_t$ measurements and sometimes of centripetal acceleration $\omega^2$; the third software module 130 includes instructions for determining a first predicted angular velocity $\omega_{n+1}$ as a function of the angular acceleration $\epsilon$ and a previously predicted angular velocity $\omega_n*$; the fourth software module 132 includes instructions for determining a correction factor cf as a function of the centripetal acceleration $\omega^2$, a gain k, and the previously predicted angular velocity $\omega_n*$; and the fifth software module 134 includes instructions for determining a corrected predicted angular velocity $\omega_{n+1}*$ as a function of the first predicted angular velocity $\omega_{n+1}$ and the correction factor cf. The method is repeated for the next time step as acceleration a is measured again and corrected predicted angular velocity $\omega_{n+1}*$ becomes previously predicted angular velocity $\omega_n*$.

In the exemplary embodiment associated with the array 110, the software module 126 determines centripetal acceleration $\omega^2$ as a function of normal acceleration $a_c$ measurements provided by the accelerometers 112. For example, the first software module 126 determines centripetal acceleration $\omega^2$ as a function of accelerations $a_{x1}$, $a_{x2}$, $a_{y1}$, $a_{y2}$, $a_{z1}$, $a_{z2}$. Using EQs. 2b, centripetal accelerations $\omega^2$ are given by EQs. 3:

$$\omega_x^2 = \frac{a_{x1} - a_{x2}}{2(R_{x1} + R_{x2})} - \frac{a_{y1} - a_{y2}}{2(R_{y1} + R_{y2})} - \frac{a_{z1} - a_{z2}}{2(R_{z1} - R_{z2})}$$

$$\omega_y^2 = -\frac{a_{x1} - a_{x2}}{2(R_{x1} + R_{x2})} + \frac{a_{y1} - a_{y2}}{2(R_{y1} + R_{y2})} - \frac{a_{z1} - a_{z2}}{2(R_{z1} - R_{z2})}$$

$$\omega_z^2 = -\frac{a_{x1} - a_{x2}}{2(R_{x1} + R_{x2})} - \frac{a_{y1} - a_{y2}}{2(R_{y1} + R_{y2})} + \frac{a_{z1} - a_{z2}}{2(R_{z1} - R_{z2})}$$

The second software module 128 determines angular accelerations $\epsilon$ as a function of tangential acceleration $a_t$ measurements provided by accelerometers 112. For example, the second software module 128 determines angular acceleration $\epsilon$ as a function of accelerations $a_{x3}$, $a_{x4}$, $a_{y3}$, $a_{y4}$, $a_{z3}$, $a_{z4}$. Here, angular acceleration s is also a function of angular velocities $\omega$. Angular velocities $\omega$ are determined using the square root of centripetal accelerations $\omega^2$. The magnitude of the angular velocities $\omega$ is taken and signs of previously predicted angular velocity $\omega_n*$ are used to determine the correct sign for the magnitude of the angular velocities $\omega$. Using EQs. 2a, angular accelerations $\epsilon$ are given by EQs. 4:

$$\epsilon_x = \frac{a_{y3} - a_{y4}}{R_{z1} - R_{z2}} - \omega_y \omega_z = \frac{a_{y3} - a_{y4}}{R_{z1} - R_{z2}} - \text{sign}(\omega_{y,n}^*)\text{sign}(\omega_{z,n}^*)\left|\sqrt{\omega_y^2} \sqrt{\omega_z^2}\right|$$

$$\epsilon_y = \frac{a_{z3} - a_{z4}}{R_{x1} + R_{x2}} + \omega_x \omega_z = \frac{a_{z3} - a_{z4}}{R_{x1} - R_{x2}} + \text{sign}(\omega_{x,n}^*)\text{sign}(\omega_{z,n}^*)\left|\sqrt{\omega_x^2} \sqrt{\omega_z^2}\right|$$

$$\epsilon_z = \frac{a_{x3} - a_{x4}}{R_{y1} + R_{y2}} + \omega_x \omega_y = \frac{a_{x3} - a_{x4}}{R_{y1} + R_{y2}} - \text{sign}(\omega_{x,n}^*)\text{sign}(\omega_{y,n}^*)\left|\sqrt{\omega_x^2} \sqrt{\omega_y^2}\right|$$

The third software module 130 determines first predicted angular velocity $\omega_{n+1}$ as a function of the angular acceleration $\epsilon_n$ and previously predicted angular velocity $\omega_n*$. For example, the third software module 130 determines first predicted angular velocity $\omega_{n+1}$ by integrating angular acceleration $\epsilon_n$ over a time step $\Delta t$. Solving for first predicted angular velocities $\omega_{n+1}$ gives EQs. 5:

$$\omega_{x,n+1} = \omega_{x,n}^* + \epsilon_{x,n}\Delta t$$

$$\omega_{y,n+1} = \omega_{y,n}^* + \epsilon_{y,n}\Delta t$$

$$\omega_{z,n+1} = \omega_{z,n}^* + \epsilon_{z,n}\Delta t$$

The fourth software module 132 determines a correction factor cf as a function of the centripetal acceleration $\omega^2$, a gain k, and a previously predicted angular velocity $\omega_n*$. For example, the fourth software module 132 determines correction factors cf according to EQs. 6:

$$cf_x = k(\text{sign}(\omega^*_{x,n}))|\sqrt{\omega_{x,n}^2}| - \omega^*_{x,n})$$

$$cf_y = k(\text{sign}(\omega^*_{y,n}))|\sqrt{\omega_{y,n}^2}| - \omega^*_{y,n})$$

$$cf_z = k(\text{sign}(\omega^*_{z,n}))|\sqrt{\omega_{z,n}^2}| - \omega^*_{z,n})$$

where the magnitude of the square root of centripetal acceleration $\omega^2$ is taken and a sign function determines the sign of the magnitude of the square root of the centripetal acceleration $\omega^2$. The sign function returns the sign (positive or negative) of the previously predicted angular velocity $\omega_n^*$. Gain k is selected as described in further detail below.

The fifth software module 134 determines a corrected predicted angular velocity $\omega_{n+1}^*$ as a function of the first predicted angular velocity $\omega_{n+1}$ and the correction factor cf. For example, the fifth software module 134 determines corrected predicted angular velocities $\omega_{n+1}^*$ according to EQs. 7:

$$\omega^*_{x,n+1} = \omega_{x,n+1} + cf_x$$

$$\omega^*_{y,n+1} = \omega_{y,n+1} + cf_y$$

$$\omega^*_{z,n+1} = \omega_{z,n+1} + cf_z$$

Corrected predicted angular velocities $\omega_{n+1}^*$ are then sent to other vehicle control systems S to facilitate control of the vehicle 10. The corrected predicted angular velocities $\omega_{n+1}^*$ are also sent to the memory 124 to be stored as the previous corrected angular velocities $\omega_n^*$ for the next time step.

The correction factors cf increase the accuracy of the first predicted angular velocities $\omega_{n+1}$ such that the corrected predicted angular velocity $\omega_{n+1}^*$ more quickly converges to an actual angular velocity $\omega_a$ of the vehicle 10. Gain k impacts the performance of the corrective factor cf.

In the plot of FIG. 5, exemplary actual angular velocity $\omega_a$, first predicted angular velocity $\omega_{n+1}$, corrected predicted angular velocity $\omega_{n+1}^*$ with gain k of 25, and corrected predicted angular velocity $\omega_{n+1}^*$ with gain k of 1 are plotted. Here, corrected predicted angular velocity $\omega_{n+1}^*$ with gain k of 25 is closer to actual angular velocity $\omega_a$ than to corrected predicted angular velocity $\omega_{n+1}^*$ with gain k of 1. Also, corrected predicted angular velocity $\omega_{n+1}^*$ with gain k of 1 is closer to actual angular velocity $\omega_a$ than to first predicted angular velocity $\omega_{n+1}$ (with gain k of 0).

Referring to FIGS. 1 and 2, a simplified version of the system 100 is now described. Here, only certain accelerometers 112 of the array 110 are used to determine yaw rate $\omega_z$ about the z-axis. The array 110 and the associated algorithms are simplified assuming that roll rate $\omega_x$ about the x-axis and pitch rate $\omega_y$ about the y-axis are negligible. As such, EQs. 2a and 2b are simplified to EQs. 8:

$$a_{z1} = a_{xo} - \omega_z^2 R_{x1}$$

$$a_{x2} = a_{xo} + \omega_z^2 R_{x2}$$

$$a_{x3} = a_{xo} + \epsilon_z R_{y1}$$

$$a_{x4} = a_{xo} - \epsilon_z R_{y2}$$

$$a_{y1} = a_{yo} - \omega_z^2 R_{y1}$$

$$a_{y2} = a_{yo} + \omega_z^2 R_{y2}$$

$$a_{y3} = a_{yo}$$

$$a_{y4} = a_{yo}$$

$$a_{z1} = a_{zo}$$

$$a_{z2} = a_{zo}$$

$$a_{z3} = a_{zo}$$

$$a_{z4} = a_{zo}$$

Here, to determine yaw rate $\omega_z$, the array 110 can be simplified to two pairs of accelerometers 112e/112f, 112g/112h that are positioned at points $P_{y1}$, $P_{y2}$ and measure accelerations $a_{x3}$, $a_{x4}$, $a_{y1}$, $a_{y2}$.

Referring to FIG. 3, the software module 126 determines centripetal acceleration $\omega_z^2$ as a function of normal acceleration measurements $a_{y1}$, $a_{y2}$ provided by accelerometers 112e, 112g. Using EQs. 8, centripetal acceleration $\omega_z^2$ is given by EQ. 9:

$$\omega_z^2 = -\frac{a_{y1} - a_{y2}}{R_{y1} + R_{y2}}$$

The second software module 128 determines angular acceleration $\epsilon_z$ as a function of tangential acceleration measurements $a_{x3}$, $a_{x4}$ provided by accelerometers 112f, 112h. Using EQs. 8, angular acceleration $\epsilon_z$ is given by EQ. 10:

$$\epsilon_z = -\frac{a_{x3} - a_{x4}}{R_{y1} + R_{y2}}$$

The third software module 130 determines first predicted angular velocity $\omega_{z,n+1}$ as a function of the angular acceleration $\epsilon_z$ and previously predicted angular velocity $\omega_{z,n}^*$. For example, the third software module 130 determines first predicted angular velocity $\omega_{z,n+1}$ by integrating angular acceleration $\epsilon_z$ over a time step $\Delta t$. Solving for first predicted angular velocity $\omega_{z,n+1}$ gives EQ. 11:

$$\omega_{z,n+1} = \omega^*_{z,n} + \epsilon_{z,n} \Delta t$$

The fourth software module 132 determines a correction factor cf as a function of the centripetal acceleration $\omega_z^2$, gain k, and a previously predicted angular velocity $\omega_{n,z}^*$. For example, the fourth software module 132 determines correction factor $cf_z$ according to EQ. 12:

$$cf_z = k(\text{sign}(\omega^*_{z,n}))|\sqrt{\omega_{z,n}^2}| - \omega^*_{z,n})$$

where the sign function returns the sign (positive or negative) of the previously predicted angular velocity $\omega_{n,z}^*$.

The fifth software module 134 determines a corrected predicted angular velocity $\omega_{z,n+1}^*$ as a function of the first predicted angular velocity $\omega_{z,n+1}$ and the correction factor $cf_z$. For example, the fifth software module 134 determines corrected predicted angular velocity $\omega_{z,n+1}^*$ according to EQ. 13:

$$\omega^*_{z,n+1} = \omega_{z,n+1} + cf_z$$

The above-described embodiments are merely exemplary illustrations of implementations that are set forth for a clear understanding of principles. Variations, modifications, and combinations associated with the above-described embodiments may be made without departing from the scope of the claims. All such variations, modifications, and combinations are included herein by the scope of this disclosure and the following claims.

What is claimed is:

1. A system, for determining an angular velocity of a moving vehicle, comprising:
   an array of accelerometers connected to the vehicle and configured to measure tangential accelerations and normal accelerations at points of the vehicle; and a computing unit configured to receive acceleration measurements from the array of accelerometers, the computing unit comprising:
a processor; and
at least one software module comprising computer readable instructions that, when executed by the processor, cause the processor to determine the angular velocity of the vehicle by:
determining a centripetal acceleration as a function of normal acceleration measurements;
determining an angular acceleration as a function of tangential acceleration measurements;
determining a currently predicted angular velocity as a function of a previously predicted angular velocity and the angular acceleration;
determining a correction factor as a function of the centripetal acceleration, a gain, and the previously predicted angular velocity; and
determining a corrected predicted angular velocity as a function of the currently predicted angular velocity and the correction factor.

2. The system of claim 1, wherein accelerometers of at least one pair of the accelerometers, being configured to measure normal acceleration, are positioned on the vehicle so as to be directed to be collinear with an axis of a coordinate system, wherein an origin of the coordinate system is a point on the axis of the coordinate system.

3. The system of claim 2, wherein accelerometers of at least one pair of the accelerometers, being configured to measure tangential acceleration, are positioned on the vehicle so as to be directed to be perpendicular with an axis of a coordinate system, wherein an origin of the coordinate system is a point on the axis of the coordinate system.

4. The system of claim 1, wherein accelerometers of at least one pair of the accelerometers, being configured to measure tangential acceleration, are positioned on the vehicle so as to be directed to be perpendicular with an axis of a coordinate system, wherein an origin of the coordinate system is a point on the axis of the coordinate system.

5. The system of claim 1, wherein the system is configured to measure each of yaw rate, roll rate, and pitch rate of the vehicle.

6. The system of claim 1, wherein the array of accelerometers includes three pairs of accelerometers that are configured to measure normal acceleration and three pairs of accelerometers that are configured to measure tangential acceleration.

7. The system of claim 1, the computer readable instructions being further configured to cause the processor to determine angular acceleration as a function of the centripetal acceleration and the previously predicted angular velocity.

8. The system of claim 1, the computer readable instructions being further configured to cause the processor to determine:
the currently predicted angular velocity as an integral of the angular acceleration;
the correction factor as:
a difference between:
a product of a magnitude of a square root of the centripetal acceleration and a sign of the previously predicted angular velocity; and
the previously predicted angular velocity; and
the difference being multiplied by the gain; and
the corrected predicted angular velocity as the first currently predicted angular velocity plus the correction factor.

9. The system of claim 1, the computer readable instructions being further configured to cause the processor to determine the first currently predicted angular velocity as a function of an integral of the angular acceleration.

10. The system of claim 1, the computer readable instructions being further configured to cause the processor to determine the correction factor as:
a difference between:
a product of a magnitude of a square root of the centripetal acceleration and a sign of the previously predicted angular velocity; and
the previously predicted angular velocity; and
the difference being multiplied by the gain.

11. The system of claim 1, the computer readable instructions being further configured to cause the processor to determine the corrected predicted angular velocity as the currently predicted angular velocity plus the correction factor.

12. The system of claim 1, wherein the accelerometers are thermal accelerometers.

13. A non-transitory computer readable storage medium, comprising:
acceleration measurements received from an array of accelerometers positioned on a vehicle; and
at least one software module comprising computer readable instructions that, when executed by a processor, cause the processor to determine an angular velocity of the vehicle by:
determining a centripetal acceleration as a function of normal acceleration measurements measured by the array;
determining an angular acceleration as a function of tangential acceleration measurements measured by the array;
determining a currently predicted angular velocity as a function of a previously predicted angular velocity and the angular acceleration;
determining a correction factor as a function of the centripetal acceleration, a gain, and a previously predicted angular velocity; and
determining a corrected predicted angular velocity as a function of the currently predicted angular velocity and the correction factor.

14. The computer readable medium of claim 13, wherein the angular velocity includes each of yaw rate, roll rate, and pitch rate of the vehicle.

15. The computer readable medium of claim 13, the computer readable instructions being further configured to cause the processor to determine angular acceleration as a function of the centripetal acceleration and the previously predicted angular velocity.

16. The computer readable medium of claim 13, the computer readable instructions being further configured to cause the processor to determine:
the currently predicted angular velocity as the integral of the angular acceleration;
the correction factor as:
the difference between:
a product of a magnitude of a square root of the centripetal acceleration and a sign of the previously predicted angular velocity; and
the previously predicted angular velocity; and
the difference being multiplied by the gain; and
the corrected predicted angular velocity as the currently predicted angular velocity plus the correction factor.

17. The computer readable medium of claim 13, the computer readable instructions being further configured to cause the processor to determine the currently predicted angular velocity as a function of the integral of the angular acceleration.

18. The computer readable medium of claim 13, the computer readable instructions being further configured to cause the processor to determine the correction factor as:
the difference between:
a product of a magnitude of a square root of the centripetal acceleration and a sign of previously predicted angular velocity; and
the previously predicted angular velocity; and
the difference being multiplied by the gain.

19. The computer readable medium of claim 13, the computer readable instructions being further configured to cause the processor to determine the corrected predicted angular velocity as the first currently predicted angular velocity plus the correction factor.

20. A method of determining angular velocity, comprising:
measuring tangential accelerations and normal accelerations at points of a vehicle with an array of accelerometers connected to the vehicle;
with a computing unit:
determining a centripetal acceleration as a function of normal acceleration measurements;
determining an angular acceleration as a function of tangential acceleration measurements;
determining a currently predicted angular velocity as a function of a previously predicted angular velocity and the angular acceleration;
determining a correction factor as a function of the centripetal acceleration, a gain, and the previously predicted angular velocity; and
determining a corrected predicted angular velocity as a function of the currently predicted angular velocity and the correction factor.

* * * * *